No. 716,275. Patented Dec. 16, 1902.
C. D. QUILLEN.
VEHICLE BRAKE.
(Application filed Feb. 3, 1902.)

(No Model.) 2-Sheets—Sheet 1.

Witnesses
Inventor
C. D. Quillen
By R. S. & A. B. Lacey Attorneys

THE NORRIS PETERS CO., PHOTO-LITHO., WASHINGTON, D. C.

No. 716,275. Patented Dec. 16, 1902.
C. D. QUILLEN.
VEHICLE BRAKE.
(Application filed Feb. 3, 1902.)
(No Model.) 2 Sheets—Sheet 2.
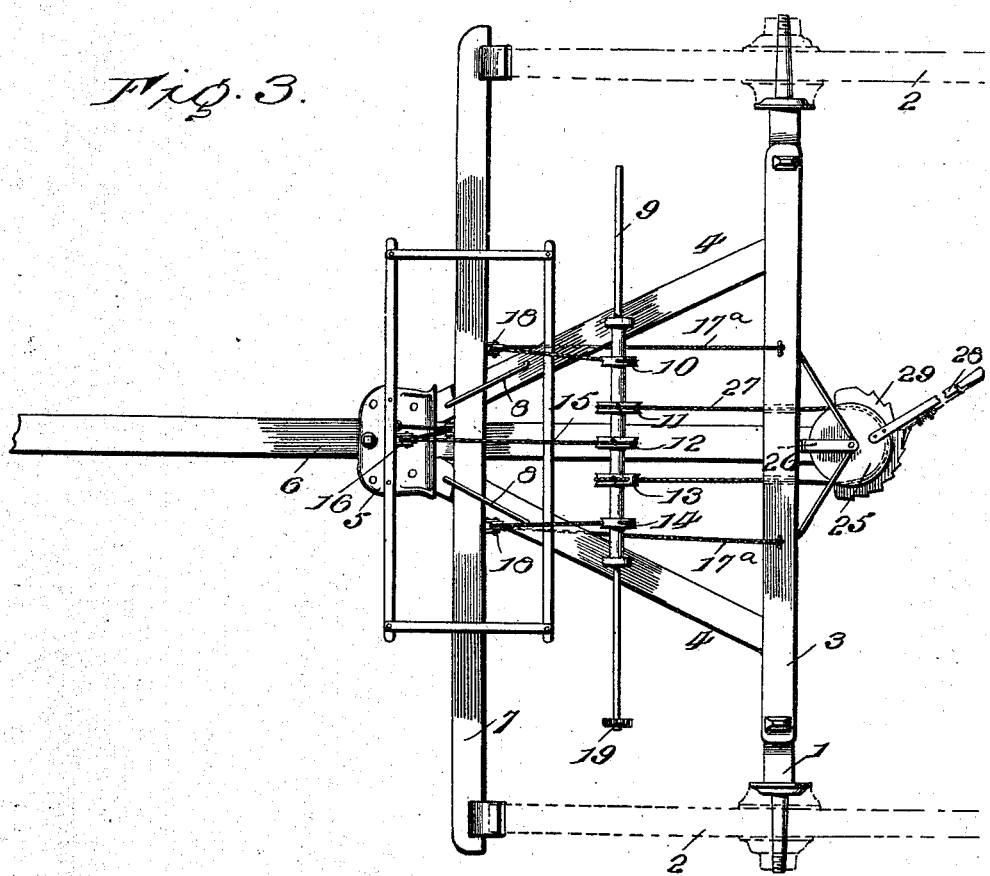
Witnesses
Jno. Robb
Percy L. Worldridge
Inventor
C. D. Quillen.
By
R. S. & A. B. Lacey
Attorneys.

UNITED STATES PATENT OFFICE.

CHRISTOPHER D. QUILLEN, OF MINERAL, INDIANA.

VEHICLE-BRAKE.

SPECIFICATION forming part of Letters Patent No. 716,275, dated December 16, 1902.

Application filed February 3, 1902. Serial No. 92,450. (No model.)

*To all whom it may concern:*

Be it known that I, CHRISTOPHER D. QUILLEN, a citizen of the United States, residing at Mineral, in the county of Greene and State of Indiana, have invented certain new and useful Improvements in Vehicle-Brakes; and I do hereby declare the following to be a full, clear, and exact description of the invention, such as will enable others skilled in the art to which it appertains to make and use the same.

The purpose of the present invention is the provision of a brake mechanism for vehicles which can be operated either from the rear, front, or side of the wagon, according to the convenience of the driver, the connections being such as not to interfere with the setting of the brake from any determinate point when required.

For a full description of the invention and the merits thereof and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1:
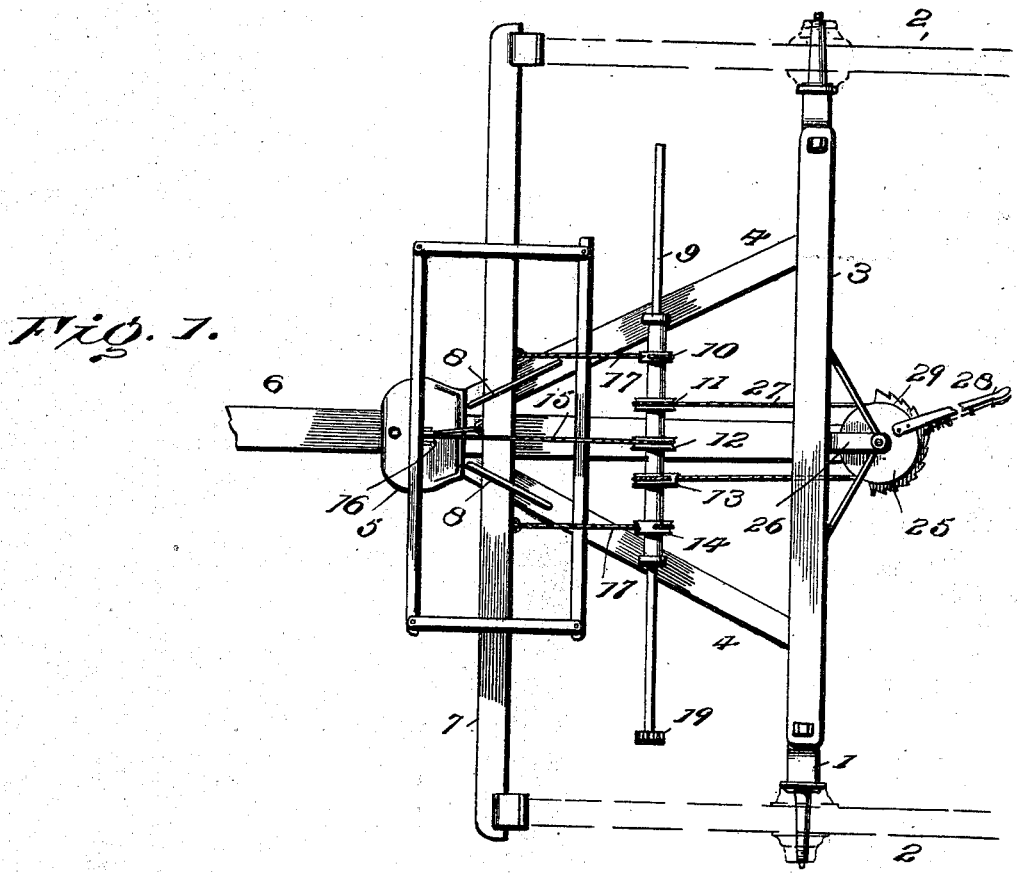
Figure 2:
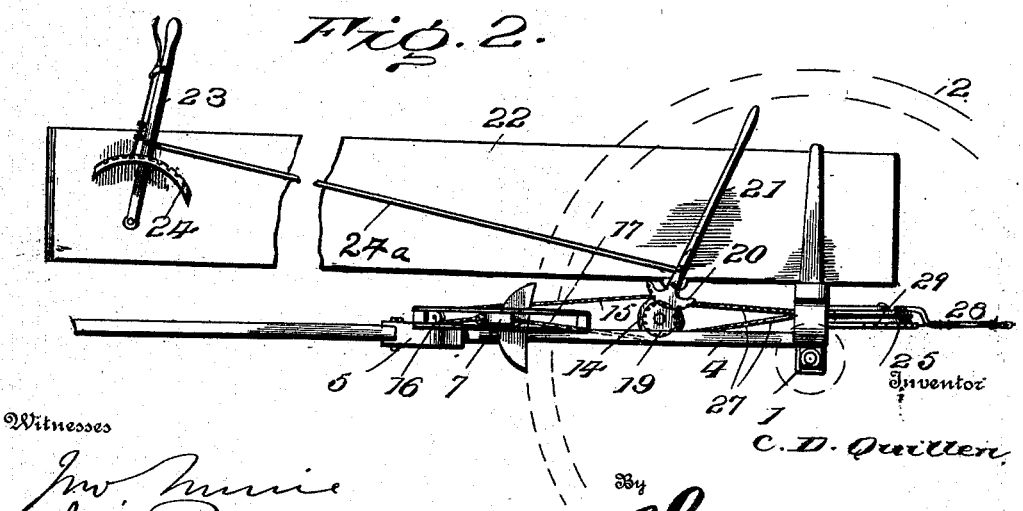

Figure 1 is a top view of the rear portion of a vehicle running-gear, showing the application of the invention. Fig. 2 is a side view, the wagon-body being in position and the forward part of the running-gear omitted. Fig. 3 is a view similar to Fig. 1, showing a modification. Fig. 4 is a perspective view of the brake-actuating shaft and adjuncts.

Corresponding and like parts are referred to in the following description and indicated in all the views of the drawings by the same reference characters.

The invention is illustrated in connection with the rear portion of a vehicle running-gear, since this is its most general application, although it is not intended to restrict the same to this particular location. The axle 1 is provided with wheels 2 and has the bolster 3 connected thereto in any manner. The hounds 4 are joined at their converged ends to the head 5, through which the pole or reach 6 passes for adjustably connecting the rear portions of the running-gear to the front part in the usual manner. The brake-beam 7 is slidably mounted upon the hounds and is limited in its movements by a keeper 8 in the usual manner. The brake-actuating shaft 9 is journaled in bearings applied to the hounds 4 or other convenient portion of the running-gear and is provided with a series of pulleys 10, 11, 12, 13, and 14. A chain or cable 15 is connected at one end to the central pulley 12 and passes around a sheave-pulley 16 and is made fast at its opposite end to the central part of the brake-beam 7. When the shaft 9 is turned in one direction, the end portion of the chain or cable 16, attached to the pulley 12, is wound thereon and moves the brake-beam 7, so as to withdraw the brake-shoes from engagement with the wheels 2, thereby releasing the brake after they have been applied. Chains or cables 17 are connected at one end to the outer pulleys 10 and 14 and have the other end attached to the brake-beam 7. Upon rotating the shaft 9 in the opposite direction the chains or cables 17 are wound upon the pulleys 10 and 14 and move the brake-beam so as to carry the brake-shoes into contact with the wheels 2, thereby setting the brake. As shown in Fig. 3, the chains or cables 17ª have one end attached to the pulleys 10 and 14 and the opposite end connected to the bolster 3 or other selected part of the running-gear and pass around sheave-pulleys 18, applied to the brake-beam 7. This construction admits of the brake being more firmly applied, and is therefore preferred in some instances.

The brake-actuating shaft 9 is adapted to be operated in a number of different ways, some of which are illustrated and will hereinafter be described in detail. A pinion 19 is secured to one end of the shaft 9 and is in mesh with a toothed segment 20 at the lower end of a hand-lever 21, fulcrumed to a side of the wagon-body 22. This construction enables the brake to be set from a side of the wagon near the rear end. A lever 23 is located near the front end of the wagon within convenient reach of the driver's seat and is connected by means of a rod 24ª with the lever 21 and enables the brakes to be set from the front end of the wagon without requiring the dismounting of the driver. This lever 23 is provided with the usual hand-latch for cooperation with the toothed bar 24 for holding the lever in an adjusted position.

To admit of setting the brake from the rear of the wagon, a pulley 25 is mounted in a bracket 26, extended from the bolster 3 and laterally braced. A cable or chain 27 is attached intermediate of its ends to the pulley 25, and its end portions are adapted to wind in opposite directions upon the respective pulleys 11 and 13, to which they are attached. A lever 28 is connected with the pulley 25 for rotation therewith and is provided with a hand-latch to engage with the teeth of a notched plate 29, concentric with the pulley 25, for holding the lever in an adjusted position. The shaft 9 is adapted to be positively rotated from any of the points noted, thereby admitting of the brakes either being set or released, as required.

Having thus described the invention, what is claimed as new is—

In combination, a brake-beam, a brake-actuating shaft, a series of pulleys mounted upon and rotatable with said brake-actuating shaft, flexible connections between corresponding pulleys and the brake-beam and adapted to wind reversely upon the said pulleys to effect a positive movement of the brake-beam in either direction, a pair of pulleys secured to the brake-actuating shaft, a third pulley arranged horizontally at the rear of the wagon and provided with a hand operating-lever, a flexible connection between the said third pulley and the pair of pulleys and adapted to wind reversely upon the latter, a hand-lever at the side of the wagon, gearing between the last-mentioned lever and the brake-actuating shaft, and a third lever located within convenient reach of the driver's seat and connected with the rear side lever, substantially as set forth.

In testimony whereof I affix my signature in presence of two witnesses.

CHRISTOPHER D. QUILLEN. [L. S.]

Witnesses:
LALDAS S. FORBES,
HARLEY TUMAN.